US008905468B2

(12) United States Patent
Kitani et al.

(10) Patent No.: US 8,905,468 B2
(45) Date of Patent: Dec. 9, 2014

(54) SUNSHADE APPARATUS

(71) Applicant: Aisin Seiki Kabushiki Kaisha, Kariya (JP)

(72) Inventors: Takashi Kitani, Nagoya (JP); Kazuhiko Yoshizawa, Chiryu (JP); Jun Matsushita, Anjo (JP)

(73) Assignee: Aisin Seiki Kabushiki Kaisha, Kariya-shi, Aichi-ken (JP)

( * ) Notice: Subject to any disclaimer, the term of this patent is extended or adjusted under 35 U.S.C. 154(b) by 0 days.

(21) Appl. No.: 13/909,157

(22) Filed: Jun. 4, 2013

(65) Prior Publication Data

US 2013/0328344 A1 Dec. 12, 2013

(30) Foreign Application Priority Data

Jun. 8, 2012 (JP) ................................ 2012-131167

(51) Int. Cl.
*B60J 3/02* (2006.01)
*B60J 7/00* (2006.01)
*B60J 7/043* (2006.01)

(52) U.S. Cl.
CPC .............. *B60J 3/0204* (2013.01); *B60J 7/0015* (2013.01)
USPC ....................... 296/214; 160/370.22; 160/265

(58) Field of Classification Search
CPC ...... B60J 7/0007; B60J 7/0015; B60J 7/0023; B60J 7/0038
USPC .............................. 296/214; 160/370.22, 265
See application file for complete search history.

(56) References Cited

U.S. PATENT DOCUMENTS

| 6,682,133 B2 * | 1/2004 | Glasl ........................ 296/216.01 |
| 2008/0179024 A1 * | 7/2008 | Fichter et al. ............ 160/370.22 |
| 2012/0111511 A1 | 5/2012 | Kitani et al. |

FOREIGN PATENT DOCUMENTS

| DE | 199 10 830 C1 | 6/2000 |
| DE | 10 2006 015 668 A1 | 10/2007 |
| DE | 102007039214 | * 2/2009 |

* cited by examiner

*Primary Examiner* — Dennis H Pedder
(74) *Attorney, Agent, or Firm* — Finnegan, Henderson, Farabow, Garrett & Dunner, LLP

(57) ABSTRACT

A sunshade apparatus includes: a light blocking sheet to block light at an opening of a vehicle and open the opening; a winding member to which a first edge of the sheet is fixed and which is capable of winding and unwinding the sheet; turning members disposed on both sides of the opening in the width direction; a single rope member adjustably engaged with a second edge of the sheet in the operating direction, extending from both end portions of the second edge respectively toward the light-blocking side in the operating direction, and turning at both of the turning members respectively toward the opening side in the operating direction, and whose both side terminals are respectively fixed to both end portions of the winding member to be capable of being wound and unwound by the winding member; and an urging member to urge the winding member to rotate.

9 Claims, 5 Drawing Sheets

SUNSHADE APPARATUS

TECHNICAL FIELD

This disclosure relates to a sunshade apparatus configured to block light at an opening formed in a vehicle and open the opening to the light with a light blocking sheet.

BACKGROUND DISCUSSION

In a related art, an apparatus disclosed, for example, in Germany Patent No. 102006015 668A1, is known as the sunshade apparatus of this type. As illustrated in FIG. 7, the sunshade apparatus includes a light blocking sheet 91, a winding tube 92 configured to wind and unwind the light blocking sheet 91, wires 93 configured to hold widthwise edge portions of the light blocking sheet 91, and an operating bar 94 for a manual operation of the light blocking sheet 91. The wires 93 are extended between the winding tube 92 and pulleys 95. The light blocking sheet 91 is provided with a winding force from the winding tube 92, and is provided with the winding force of the winding tube 92 as a unwinding force by the wires 93 via the pulleys 95. The light blocking sheet 91 is configured to be capable of stopping at a given position at which an operating force is released by power equilibrium between the winding force from the winding tube 92 and the unwinding force from the wires 93 via the pulleys 95. Designing the pulleys 95 to be adjustable in position in a floating manner is also proposed.

In Germany Patent No. 102006015 668A1, by the provision of the two wires 93 configured to provide the light blocking sheet 91 with the unwinding force on the left and the right (widthwise both sides of the light blocking sheet 91), adjustments of the left and the right unwinding forces and a phase difference between the left and the right need to be performed respectively, so that increase in number of adjusting steps is inevitable. Since the unwinding forces on the left and the right sides and the phase difference between the left and the right are susceptible to shifting, the operating bar 94 tends to be inclined with respect to an operating direction (direction of movement) of the light blocking sheet 91, for example, and the light blocking sheet 91 tends to ruck due to the inclination.

SUMMARY

An object of this disclosure is to provide a sunshade apparatus with which it is easy to adjust a phase difference between the left and the right and unwinding forces on the left and the right of a light blocking sheet.

A first aspect of this disclosure is directed to a sunshade apparatus including: a light blocking sheet configured to block light at an opening formed in a vehicle and open the opening to light; a winding member to which a first edge portion serving as an opening side edge portion of the light blocking sheet in an operating direction of the light blocking sheet is fixed and which is configured to be capable of winding and unwinding the light blocking sheet; a pair of turning members disposed on both sides of the opening in the width direction; a single rope member which is adjustably engaged with a second edge portion serving as an blocking side edge portion of the light blocking sheet in the operating direction of the light blocking sheet, extends from both end portions of the second edge portion respectively toward the light-blocking side in the operating direction of the light blocking sheet and turns at both of the turning members respectively toward the opening side in the operating direction of the light blocking sheet, and whose both side terminals are respectively fixed to both end portions of the winding member so as to be capable of being wound and unwound by the winding member; and an urging member configured to urge the winding member to rotate.

In this configuration, the winding member is urged to rotate by the urging member, an that, for example, the light blocking sheet is wound from the side of the first edge portion and, on the other hand, is unwound from the side of the second edge portion via the rope member wound from the side of both of the side terminals. Therefore, the light blocking sheet may be stably held at a given position where light is blocked at the opening by power equilibrium between a winding direction and a unwinding direction. The number of the rope member is one, an adjustment of the phase difference between the left and the right (both sides in the width direction) of the light blocking sheet is easily achieved, or an adjustment of a unwinding force on the left and the right of the light blocking sheet is easily achieved.

A second aspect of this disclosure is directed to a sunshade apparatus including: a light blocking sheet configured to block light at an opening formed in a vehicle and open the opening to light; a winding member fixed to a first edge portion serving as an opening side edge portion of the light blocking sheet in an operating direction of the light blocking sheet and configured to move the light blocking sheet to the opening side by winding the light blocking sheet; a single rope member connected to the light blocking sheet on a second edge portion serving as a blocking side edge portion of the light blocking sheet in the operating direction of the light blocking sheet and configured to move the light blocking sheet to the blocking side by both end portions being wound by the winding member; and an urging member configured to urge the winding member to rotate.

In this configuration, the winding member is urged to rotate by the urging member, so that, for example, the light blocking sheet is wound from the side of the first edge portion and, on the other hand, is unwound from the side of the second edge portion via the rope member. Therefore, the light blocking sheet may be stably held at a given position where the light blocking sheet blocks light in the opening by power equilibrium between a winding direction and a unwinding direction.

According to the aspects of this disclosure, a sunshade apparatus with which it is easy to adjust a phase difference between the left and the right and unwinding forces on the left and the right of a light blocking sheet may be provided.

DETAILED DESCRIPTION

Referring now to FIG. 1 to FIG. 6, an embodiment disclosed here will be described. In the following description, a fore-and-aft direction of a vehicle is referred to as "fore-andaft direction". A widthwise inner side of the vehicle directed toward the inside of a cabin is referred to as "inside of the vehicle", and a widthwise outer side of the vehicle directed outward of the cabin is referred to as "outside of the vehicle".

Figure 1:
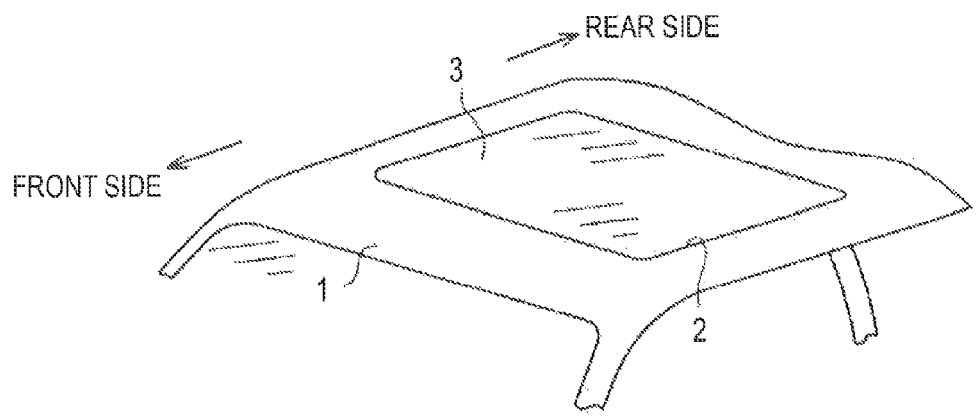
FIG. 1 is a perspective view illustrating a roof of a vehicle.

As illustrated in FIG. 1, a vehicle roof 1 of an automotive vehicle, for example, is formed with a substantially rectangular roof opening 2 as an opening, and a roof panel 3 formed of glass or resin and defining a translucent area is installed in the roof opening 2.

Figure 2:
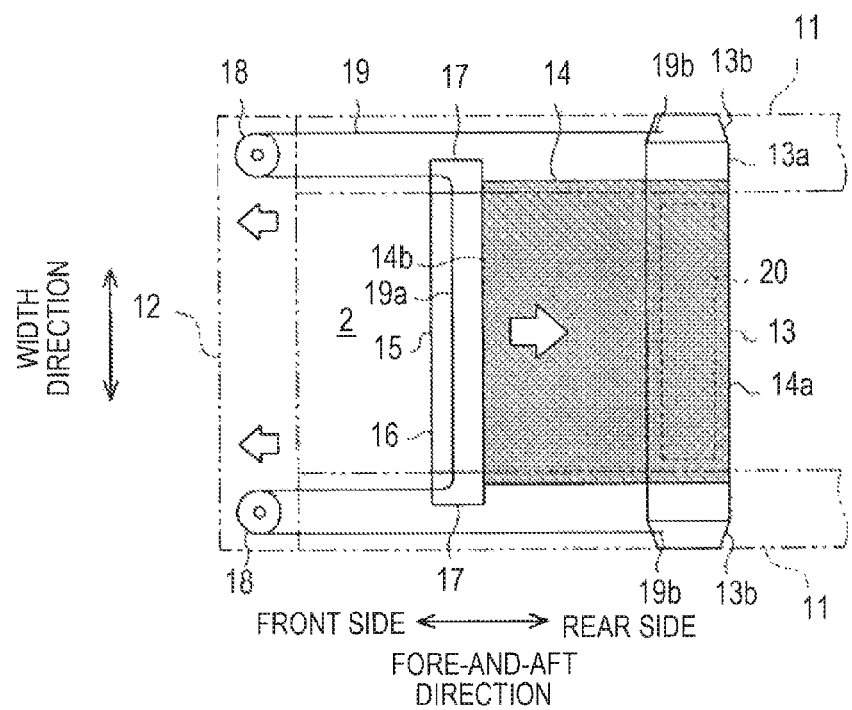
FIG. 2 is a plan view schematically illustrating an embodiment disclosed here.

A illustrated in FIG. 2, in the edge portions of the roof opening 2 on both of he sides in the width direction of the vehicle, the vehicle roof 1 includes a pair of guide rails 11 which are extruded members formed of, for example, aluminum alloy and extend in the fore-and-aft direction, and a front housing 12 formed of, for example, a resin material extending in the vehicle width direction at an edge portion of the roof opening 2 on the front side of the vehicle. The front housing 12 is coupled to both of the guide rails 11 at front end portions of the vehicle.

A winding tube 13 as a winding member extending in the vehicle width direction is rotatably supported by rear end portions of both of the guide rails 11 so as to be bridged therebetween. An axial line of the winding tube 13 extends in the vehicle width direction, and includes a substantially cylindrical shaped body portion 13a extending across both of the guide rails 11 and a pair of substantially truncated conical shaped bobbins 13b coupled to both ends of the body portion 13a in the longitudinal direction so as to rotate with respect to each other and axially supported by both of the guide rails 11 via adequate brackets.

Alight blocking sheet 14 configured to block light at the roof opening 2 and open the roof opening to the light is fixed to the body portion 13a of the winding tube 13. In other words, the light blocking sheet 14 is fixed to the body portion 13a at a first edge portion 14a thereof, which is an edge portion on a rear side of the vehicle (an edge portion on an open side of the light blocking sheet 14 in an operating direction), and is configured to be woundable-unwoundable thereon or therefrom in association with a rotation of the body portion 13a (the winding tube 13).

In contrast, the light blocking sheet 14 is fixed to an operating member 15 at a second edge portion 14b, which is an edge portion on a front side of the vehicle (an edge on a blocking side in the operating direction of the light blocking sheet 14). In other words, the operating member 15 includes a substantially elongated handle member 16 extending in the vehicle width direction so as to be bridged between both of the guide rails 11 on the vehicle front side of the winding tube 13 and extending across both of the guide rails 11, and a pair of shoe members 17 attached on both end portions of the handle member 16 in the longitudinal direction and disposed so as to be slidable on both of the guide rails 11. The second edge portion 14b of the light blocking sheet 14 is fixed to the operating member 15 at the handle member 16 extending along the second edge portion 14b.

The light blocking sheet 14 is unwound from the body portion 13a (the winding tube 13) so as to block the light at the roof opening 2 by the handle member 16 (the second edge portion 14b) moving toward the front of the vehicle while both of the shoe members 17 of the operating member 15 slide on both of the guide rails 11. Alternatively, the light blocking sheet 14 is wound by the body portion 13a (the winding tube 13) so as to release the light at the roof opening 2 by the handle member 16 (the second edge portion 14b) moves toward the rear of the vehicle while both of the shoe members 17 of the opening member 15 slide on both of the guide rails 11.

Pulleys 18 as a pair of turning members are disposed at both end portions of the front housing 12 in the vehicle width direction (both sides of the roof opening 2 in the width direction), which corresponds to the vehicle-front side of both of the guide rails 11. The pulleys 18 each have an axial line extending in a vehicle height direction.

A wire 19 as a single rope member is fixed to the handle member 16 (the second edge portion 14b) of the operating member 15. In other words, the wire 19 is fixed to a coupling portion 19a guided on the handle member 16 along the longitudinal direction (the vehicle width direction) of the handle member 16. The wire 19 goes out from both ends of the handle member 16 in the longitudinal direction and is turned at both of the shoe members 17 so as to extend respectively toward the front of the vehicle, is wound around both of the pulleys 18 respectively from the inside of the vehicle, and is turned (reversed) so as to extend toward the rear of the vehicle. Subsequently, both side terminals 19b of the wire 19 extending toward the rear of the vehicle are fixed to both of the bobbins 13b of the winding tube 13 respectively, and are allowed to be wound and unwound by both of the bobbins 13b (the winding tube 13).

The winding direction of the light blocking sheet 14 with respect to the winding tube 13 (the body portion 13a) and the winding direction of the wire 19 with respect to the winding tube 13 (both of the bobbins 13b) are set to be opposite to each other.

Here, the winding tube 13 includes an urging member 20 configured to urge the body portion 13a and both of the bobbins 13b to rotate in one direction relatively to each other (for example, a swing coil spring) integrated therein. In this embodiment, the urging member 20 urges the body portion 13a to rotate in the direction of winding the light blocking sheet 14 from the side of the first edge portion 14a. Therefore, both of the bobbins 13b urged by the urging member 20 to rotate in the direction opposite to the body portion 13a are urged to rotate in the direction of winding the wire 19 from the side of both of the side terminals 19b. This is because the directions of rotation in which the body portion 13a and both of the bobbins 13b are urged are opposite to each other, and both of the winding directions of the light blocking sheet 14 and the wire 19 are opposite to each other as described above.

The light blocking sheet 14 is then wound by the body portion 13a (the winding tube 13) from the side of the first edge portion 14a by an urging force of the urging member 20 and, on the other hand, is unwound from the side of the second edge portion 14b (the operating member 15) via the wire 19 wound from the side of both of the side terminals 19b by both of the bobbins 13b (the winding tube 13). Therefore, the light blocking sheet 14 is stably held at a given position where the light is blocked at the roof opening 2 by power equilibrium between the winding direction and the unwinding direction.

Subsequently, the wire 19 and a peripheral structure thereof will further be described.

Figure 3:
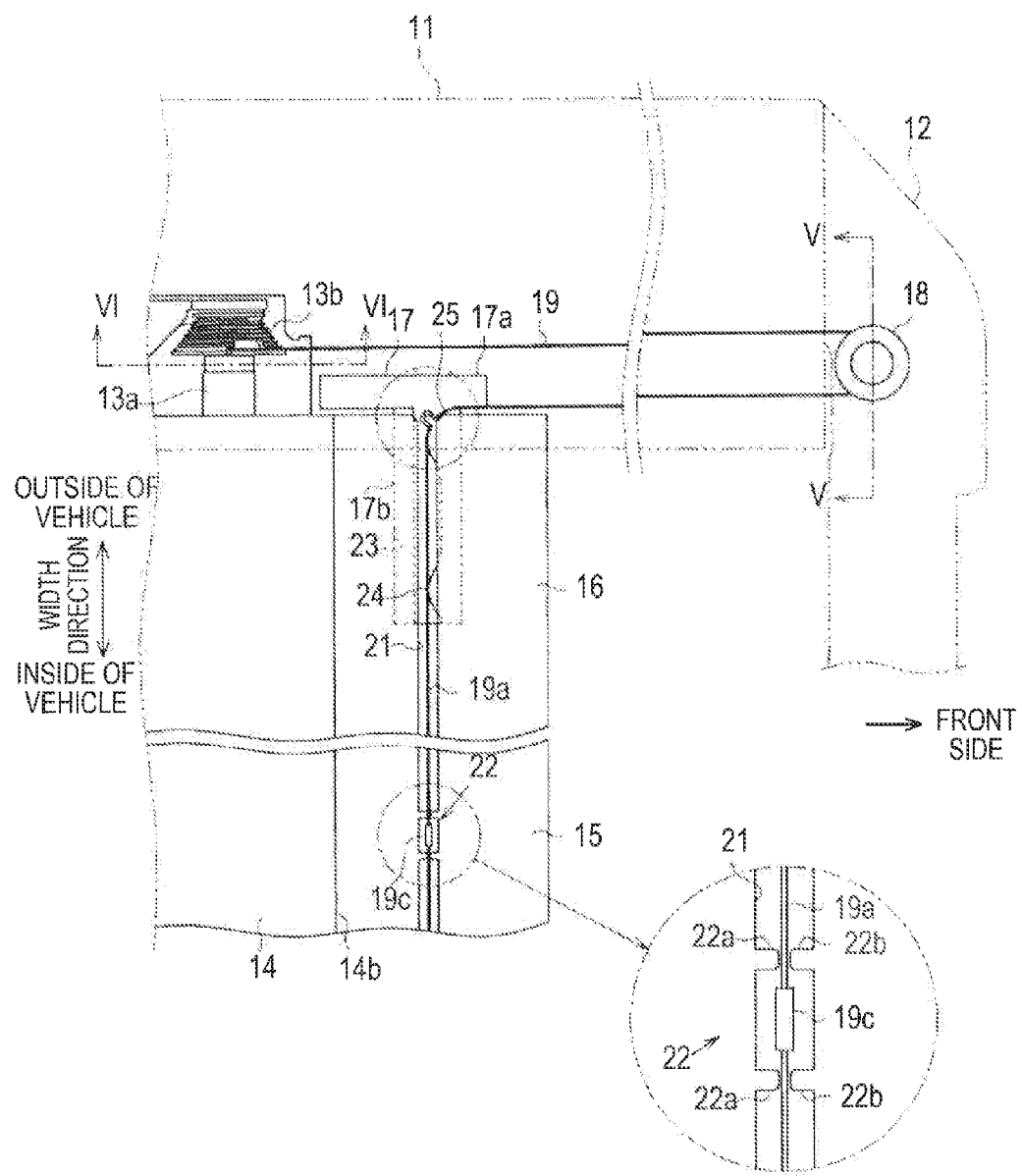
FIG. 3 is a plan view illustrating the same embodiment.

As illustrated in FIG. 3, the handle member 16 is formed with a supporting groove 21 so as to extend along the substantially entire length thereof in the longitudinal direction (the vehicle width direction). The handle member 16 is formed with a restricting portion 22 at a center portion in the longitudinal direction of the supporting groove 21. As illustrated in FIG. 3 in an enlarged scale, the restricting portion 22 is provided with a pair of projecting walls 22a projecting in parallel to each other from a surface of the supporting groove 21 on the vehicle front side at a distance in the vehicle width direction, and a pair of projecting walls 22b projecting in parallel to each other from a surface of the supporting groove 21 on the vehicle rear side at a distance in the vehicle width direction so as to face both of the projecting walls 22a, respectively. Both of the facing projecting walls 22a and 22b partition the supporting groove 21 in the vehicle width direction at a distance therebetween. Therefore, the restricting portion 22 defines a substantially box-shaped space at the center portion in the supporting groove 21 in the longitudinal direction.

The coupling portion 19a of the wire 19 is inserted and guided from the opening side of the supporting groove 21 over the entire length thereof, and is penetrated through both of the projecting walls 22a and 22b facing each other at the restricting portion 22. A substantially column-shaped engaging portion 19c is secured to an outer peripheral portion of the coupling portion 19a so as to be aligned with the restricting portion 22. The length of the engaging portion 19c in the vehicle width direction is set to be shorter than the length of the space defined by the restricting portion 22 in the vehicle width direction, and the engaging portion 19c is loosely fitted on the restricting portion 22 when the coupling portion 19a is guided in the supporting groove 21. Therefore, a displacement of the coupling portion 19a along the supporting groove 21 (the second edge portion 14b) is restricted in a fixed range until the engaging portion 19c comes into abutment with the restricting portion 22.

The handle member 16 is formed with attaching holes 23 communicating therewith at ends thereof in the longitudinal direction below the supporting groove 21, and the shoe members 17 are attached in the attaching holes 23. In other words, the shoe members 17 include shoe portions 17a sliding along the guide rails 11 respectively, and include attaching projections 17b projecting from the shoe portion 17a toward the inside of the vehicle and being fitted into the attaching holes 23. The shoe members 17 are fixed to the handle member 16 by the attaching projections 17b being fitted into the attaching holes 23.

The attaching projections 17b are each formed with a substantially arcuate plane-shaped intermediate guide surface 24 curved so as to project toward the rear of the vehicle in the supporting groove 21 at an end portion thereof on the inside of the vehicle. The coupling portion 19a guided in the supporting groove 21 is hooked on the intermediate guide surfaces 24 and hence is guided in terms of extension in the vehicle width direction. The attaching projections 17b are each formed with a substantially arcuate plane-shaped guide surface 25 curved so as to project obliquely rearward toward the outside of the vehicle in the supporting groove 21 at an end portion thereof on the outside of the vehicle. The coupling portion 19a guided in the supporting groove 21 is hooked on the guide surfaces 25 and hence is turned and guided so that distal end portions of the wire 19 connected to the coupling portion 19a extend toward the front of the vehicle.

Figure 4A:
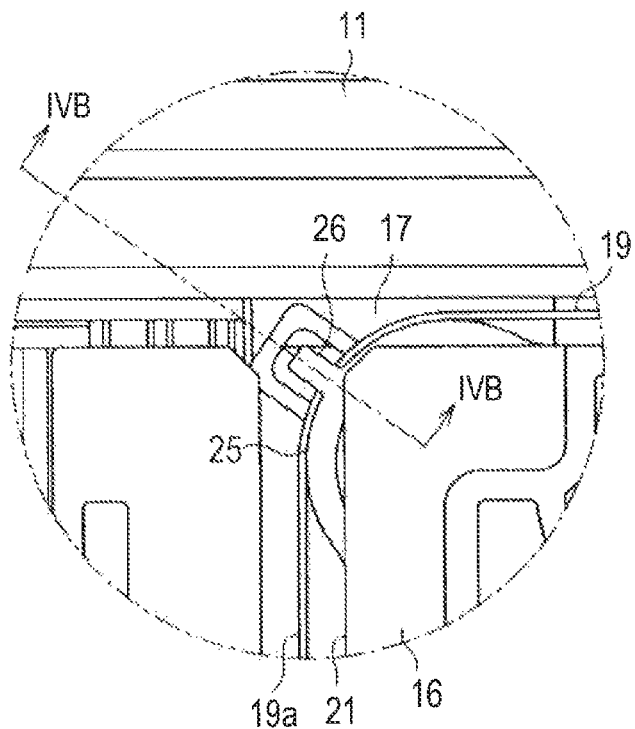
FIG. 4A is a partially enlarged view of FIG. 3.
Figure 4B:
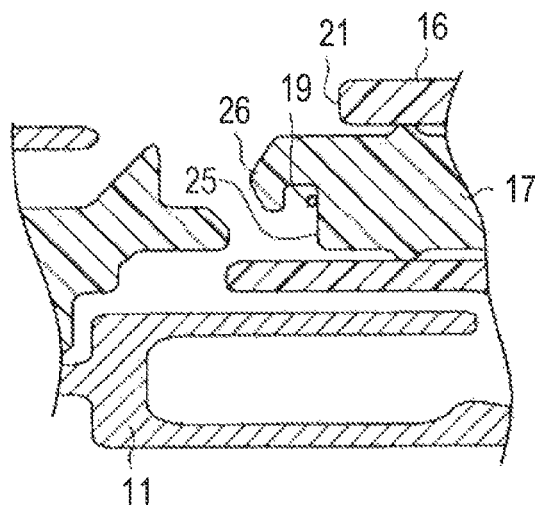
FIG. 4B is a cross-sectional view taken along a line IVB-IVB in FIG. 4A.

More specifically, as illustrated in FIG. 4A in an enlarged scale, each of the guide surfaces 25 is curved so as to surround a corner portion on the outside of the vehicle formed by the surface of the supporting groove 21 on the front side of the vehicle, whereby guiding the wire 19 turning along the guide surface 25 so as not to interfere with the handle member 16. The shoe members 17 are each provided with a hook portion 26 projecting from a center portion of each of the guide surfaces 25 in the circumferential direction toward the outside and obliquely toward the rear of the vehicle. As illustrated in FIG. 4B, each of the hook portions 26 is connected at a proximal end portion thereof to an upper portion of the guide surface 25, and is extended downward at a hook-shaped distal end portion, thereby preventing the wire 19 hooked on the guide surface 25 from coming apart.

Figure 5:
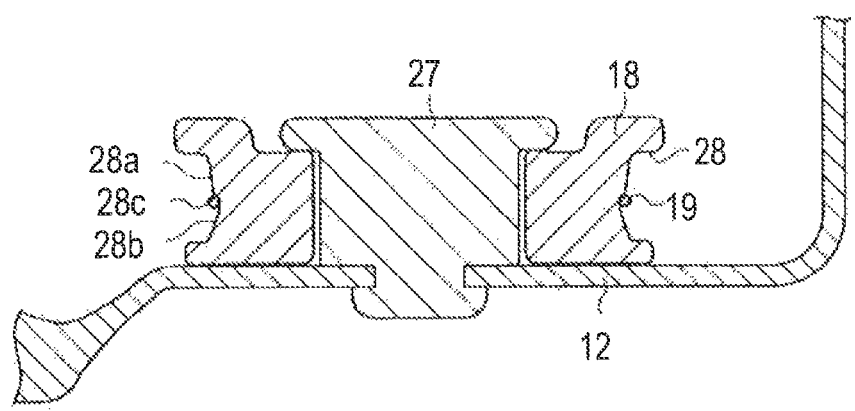
FIG. 5 is a cross-sectional view taken along a line V-V in FIG. 3.

As illustrated in FIG. 5, each of the pulleys 18 is axially supported by a supporting pin 27 secured to the front housing 12. Then, each of the pulleys 18 is formed with a peripheral groove 28 having a substantially V-shape in cross section and being configured to allow the wire 19 to be hooked thereon. The peripheral groove 28 is formed with a taper 28a inclined toward an inner periphery as it goes downward from an upper end and a taper 28b inclined more steeply toward an inner periphery than the taper 28a as it goes upward from a lower end. The peripheral groove 28 is formed with a shoulder 28c at a center portion in the height direction where both of the tapers 28a and 28b are connected so as to project toward an outer periphery more at an upper portion than at a lower portion. The wire 19 wound around each of the pulleys 18 is positioned at a boundary portion between both of the tapers 28a and 28b, which is the deepest portion of the peripheral groove 28 and is engaged with the shoulder 28c, whereby an upward displacement is restrained. This is for restraining the wire 19 extending between the guide rails 11 and the pulleys 18 from being displaced upward on the pulleys 18 and hence interfering with upper portions of front ends of the guide rails 11.

Figure 6:
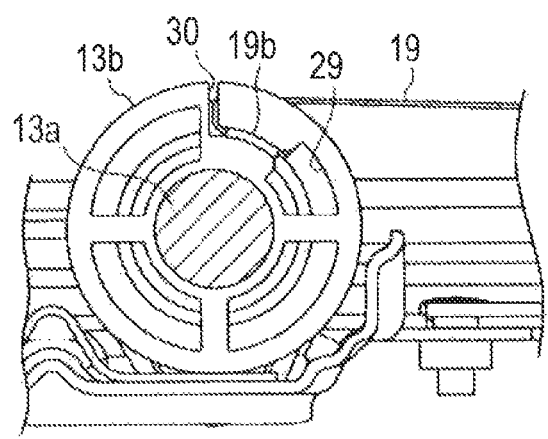
FIG. 6 is a cross-sectional view taken along a line VI-VI in FIG. 3.
Figure 7:
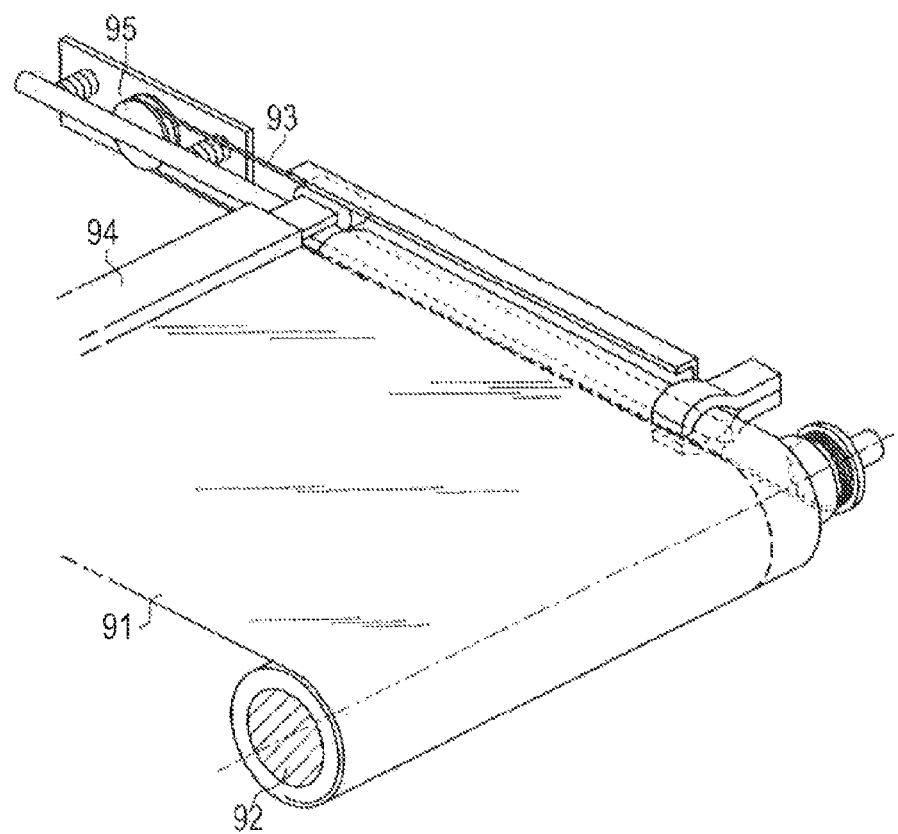
FIG. 7 is a perspective view illustrating a related art.

As illustrated in FIG. 6, each of the bobbins 13b of the winding tube 13 is formed with substantially fan-shaped insertion holes 29 on a wall portion on the inside of the vehicle (the near side intersecting a plane surface of FIG. 6), which corresponds to a larger diameter side thereof, and is formed with a substantially L-shaped deriving groove 30 communicating with the insertion holes 29 and extending in the circumferential direction, and also extending in the radial direction thereof and communicating with an outer peripheral side of each of the bobbins 13b. In contrast, the terminals 19b of the wire 19 are formed into a substantially column shape larger than the wire 19 in diameter, are inserted into the deriving groove 30 from the insertion holes 29, and are engaged with the bobbins 13b. The wire 19 passes through the deriving groove 30 in a state in which the terminals 19b are inserted into and engaged with the deriving groove 30, is derived toward the outer peripheries of the bobbins 13b, and are guided to the front of the vehicle toward the pulleys 18.

Subsequently, an operation of this embodiment disclosed here will be described.

First of all, it is assumed that the light blocking sheet 14 is wound by the winding tube 13 (the body portion 13a), and the operating member 15 is positioned on the rear side of the vehicle which comes into abutment with or in the proximity to the light blocking sheet 14 around the winding tube 13. At this time, the light blocking sheet 14 opens up the roof opening 2 to the light.

When the handle member 16 (the operating member 15) is moved manually toward the front of the vehicle while sliding both of the shoe members 17 along both of the guide rails 11 respectively in this state, the light blocking sheet 14 is unwound from the winding tube 13 and, simultaneously, the second edge portion 14b fixed to the handle member 16 moves integrally to the front of the vehicle. In association with this, the light blocking sheet 14 blocks part of the light at the roof opening 2 according to the amount of movement of the second edge portion 14b. At this time, the wire 19 is wound by the winding tube 13 in association with the rotation of the winding tube 13 (both of the bobbins 13b). when the handle member 16 (the operating member 15) is moved to the front of the vehicle to the maximum to the vicinity of the front housing 12, the light blocking sheet 14 blocks the light at the roof opening 2.

In contrast, when the handle member 16 (the operating member 15) is moved manually to the rear of the vehicle while sliding both of the shoe members 17 along both of the guide rails 11 respectively in this state, the light blocking sheet 14 is wound by the winding tube 13 and, simultaneously, the second edge portion 14b fixed to the handle member 16 moves integrally to the rear of the vehicle. In association with this, the light blocking sheet 14 releases (blocks) part of the light at the roof opening 2 according to the amount of movement of the second edge portion 14b. At this time, the wire 19 is unwound from the winding tube 13 in association with the rotation of the winding tube 13 (both of the bobbins 13b). When the handle member 16 (the operating member 15) is moved toward the rear of the vehicle to the maximum until the operating member 15 comes into abutment with or in the proximity to the light blocking sheet 14 around the winding tube 13, the light blocking sheet 14 releases the light at the roof opening 2.

It is assumed that the handle member 16 (the operating member 15) moving in the fore-and-aft direction is stopped at a given position and an operating force thereof is released. At this time, the light blocking sheet 14 is urged by the urging member 20, whereby the light blocking sheet 14 is wound by the body portion 13a (the winding tube 13) from the side of the first edge portion 14a and, on the other hand, is unwound from the side of the second edge portion 14b (the operating member 15) via the wire 19 wound from the side of both of the side terminals 19b by both of the bobbins 13b (the winding tube 13). Accordingly, the light blocking sheet 14 is stably held at the given position by the power equilibrium between a winding direction and a unwinding direction.

In particular, since the wire 19 is a common single wire extending to the left and the right of the light blocking sheet 14 (both sides in the vehicle width direction), an adjustment of a phase difference between the left and the right (both sides in the width direction) of the light blocking sheet 14 is facilitated. More specifically, at the time of assembling or using the sunshade apparatus, when the handle member 16 (the operating member 15) is moved to the rear of the vehicle to the maximum until the operating member 15 comes into abutment with the light blocking sheet 14 (or an adequate stopper) around the winding tube 13 (the body portion 13a) for example, the wire 19 is unwound from the winding tube 13 (the bobbins 13b) to the maximum in association therewith. Therefore, by using a tensile force generated at this time in the wire 19, the phase difference on the left and the right of the wire 19 is automatically adjusted. At this time, the positional adjustment of the engaging portion 19c along the second edge portion 14b in the restricting portion 22 is restricted to a fixed range, so that an excessive adjustment of the phase difference between the left and the right is restrained, for example.

As described in detail thus far, according to this embodiment, the following effects are obtained. (1) In this embodiment, since the number of the wires 19 used for holding the light blocking sheet 14 is one, an adjustment of the phase difference between the left and the right (both of the sides in the width direction) of the light blocking sheet 14 is easily achieved, or an adjustment of a unwinding force on the left and the right of the light blocking sheet 14 or the like is easily achieved. In addition, the number of adjusting steps at the time of assembly of the sunshade apparatus may be reduced.

Since the phase difference between the left and the right or a deviation of the unwinding force of the light blocking sheet 14 may be eliminated easily, a probability of inclination of the operating member 15 (the second edge portion 14b) with respect to the operating direction of the light blocking sheet 14 (the fore-and-aft direction) may be reduced, for example. Accordingly, a probability of rusting of the light blocking sheet 14 may be reduced, and improvement of an appearance is achieved.

(2) In this embodiment, the engaging portion 19c is adjusted in position along the second edge portion 14b in the restricting portion 22 at the time of assembly of the wire 19 for example, so that the adjustment of the phase difference between the left and the right is easily achieved. The positional adjustment of the engaging portion 19c along the second edge portion 14b in the restricting portion 22 is restricted to a fixed range, so that an excessive adjustment of the phase difference between the left and the right is restrained, and the probability of inclination of the operating member 15 (the second edge portion 14b) may be reduced.

(3) In this embodiment, since the restricting portion 22 is arranged at a center portion of the operating member 15 in the longitudinal direction, guiding of the wire 19 becomes substantially lateral symmetry with respect to the engaging portion 19c, so that the probability of occurrence of the positional displacement on the left and the right may be reduced.

When assembling the wire 19 for example, probability of occurrence of the positional displacement on the left and the right at the time of assembly may be reduced by assembling the wire 19 from the coupling portion 19c as a starting point to the operating member 15, both of the pulleys 18, and the winding tube 13 in sequence on the left and the right.

(4) In this embodiment, the assembly of the wire 19 to the operating member 15 (the handle member 16) is achieved only by inserting and guiding the wire 19 (the coupling portion 19a) with respect to the supporting groove 21 from the opening side over the entire length thereof, assembleability may be improved.

(5) In this embodiment, the wire 19 coming out from the supporting groove 21 of the operating member 15 (the handle member 16) may be guided smoothly toward the pulleys 18 by the guide surface 25 of the shoe members 17. The wire 19 is prevented from coming apart by the hook portion 26 on the guide surface 25, so that the wire 19 is restrained from dropping out even when the wire 19 moves violently for example.

(6) In this embodiment, the light blocking sheet 14 is operated by both of the shoe members 17 of the operating member 15 sliding along both of the guide rails 11. In this case, even when there is variation in assembly of the operating member 15 and the guide rails 11 for example, both of the shoe members 17 may be slid smoothly along both of the guide rails 11 to operate the light blocking sheet 14 by an adjustment within a range of attaching margins of the handle member 16 and both of the shoe members 17. Alternatively, even when the handle member 16 or the shoe members 17 is deformed with time or deformed by heat, both of the shoe members 17 may be slid smoothly along both of the guide rails 11 by the adjustment within the range of attaching margins of the handle member 16 and both of the shoe members 17. In other words, both of the shoe members 17 may be slid smoothly along both of the guide rails 11 to operate the light blocking sheet 14 by an adjustment within a range of insertion margins of both of the shoe members 17 (the attaching projections 17b) with respect to the handle member 16 (the attaching holes 23). By the guide surface 25 and the hook portion 26 relating to guiding of the wire 19 disposed on the shoe members 17, a posture of the wire 19 may be determined with respect to the guide rails 11 on which the shoe members 17 slide, that is, the positional accuracy with respect to the guide rails 11 may be improved, and hence the operation of the light blocking sheet 14 may be stabilized.

(7) It is assumed that the operating member 15 (the second edge portion 14b) is inclined with respect to the operating direction of the light blocking sheet 14 due to the phase difference between the left and the right of the wire 19. In this case, the inclination of the operating member 15 may be eliminated easily by moving the handle member 16 (the operating member 15) to the rear of the vehicle to the maximum until the operating member 15 comes into abutment with the light blocking sheet 14 (or the adequate stopper) around the winding tube 13 (the body portion 13a).

(8) In this embodiment, the pulleys 18 are arranged on the outside (the front side of the vehicle) of the guide rails 11, so that the interference between the wire 19 and the guide rails 11 may be restrained even when the wire 19 moves violently on the pulleys 18.

(9) In this embodiment, the wire 19 wound around each of the pulleys 18 is positioned at the boundary portion between both of the tapers 28a and 28b, which is the deepest portion of the peripheral groove 28 and is engaged with the shoulder 28c, whereby an upward displacement is restrained. Therefore, the wire 19 extending between the guide rails 11 and the pulleys 18 is prevented from being displaced upward on the pulleys 18 and hence interfering with the upper portions of the front ends of the guide rails 11.

The embodiment described above may be modified as follows.

In the embodiment described above, if the operation of the light blocking sheet 14 may be guided smoothly, at least one of both of the guide rails 11 may be omitted. In this case, at least one of both of the shoe members 17 of the operating member 15 may be omitted.

In the embodiment described above, the guide surface 25 and the hook portion 26 may be disposed on the handle member 16 of the operating member 15.

In the embodiment described above, the operating member 15 may include the handle member 16 and both of the shoe members 17 molded integrally. In this case, the guide surface 25 and the hook portion 26 may be disposed at the respective end portions of the operating member 15 in the longitudinal direction.

In the embodiment described above, the guide surface 25 and the hook portion 26 may be omitted. In this case, a guide toward the pulleys 18 of the wire 19 going out from the supporting groove 21 may be performed by using, for example, an adequate shape (for example, a corner portion formed by the supporting groove 21) of the operating member 15.

In the embodiment described above, the supporting groove 21 of the handle member 16 may be omitted. In this case, the coupling portion 19a (the wire 19) may be guided and fixed onto the operating member 15 (the handle member 16) by using an adequate fixture.

In the embodiment described above, the restricting portion 22 may be arranged at a position other than the center portion (for example, at the end portion) of the handle member 16 (the operating member 15) in the longitudinal direction.

In the embodiment described above, the restricting portion 22 of the handle member 16 (the operating member 15) and the engaging portion 19c of the wire 19 may be omitted.

In the embodiment described above, for example, a substantially arcuate plane-shaped wall portions on which the wire 19 can be hung may be employed instead of the pulleys 18 as the turning members.

In the embodiment described above, the operating member 15 may be omitted as long as the second edge portion 14b of the light blocking sheet 14 has a sufficient strength for holding the posture thereof.

In the embodiment described above, for example, a belt or a cable may be employed instead of the wire 19 as the rope member.

In the embodiment described above, the sunshade apparatus may be supported at a front edge portion of the roof opening 2 and allow unwinding of the light blocking sheet 14 to the back side of the vehicle.

In the embodiment described above, the term "light blocking sheet" ("sheet surface skin" includes a sheet which changes the transmittance of light in addition to the sheet which blocks 100% of light.

This disclosure may be applied to the sunshade apparatus to be disposed on a front glass, a side glass, and a rear glass.

According to the embodiment disclosed here, the engaging portion is adjusted in position along the second edge portion in the restricting portion at the time of assembly of the rope member for example, so that the adjustment of the phase difference between the left and the right is easily achieved. The positional adjustment of the engaging portion along the second edge portion in the restricting portion is restricted to the fixed range, so that an excessive adjustment of the phase difference between the left and the right may be restrained for example.

According to the embodiment disclosed here, the routing of the rope member becomes substantially lateral symmetry with respect to the engaging portion, so that the probability of occurrence of a positional displacement on the left and the right may be reduced.

According to the embodiment disclosed here, the assembly of the rope member to the operating member is achieved only by inserting and guiding the rope member with respect to the supporting groove from an opening side over the entire length, assembleability may be improved.

According to the embodiment disclosed here, the rope member coming out from the supporting groove of the operating member may be guided smoothly toward the turning member by the guide surface. The rope member is prevented from coming apart by the hook portion on the guide surface, so that the rope member may be restrained from dropping out even when the rope member moves violently for example.

According to the embodiment disclosed here, the light blocking sheet is operated by both of the shoe members of the operating member sliding along both of the guide rails. In this case, even when there is variation in assembly of the operating member and both of the guide rails for example, both of the shoe members may be slid smoothly along both of the guide rails to operate the light blocking sheet by the adjustment within a range of the attaching margins of the handle member and both of the shoe members. By the guide surface and the hook portion relating to guiding of the rope member disposed on the shoe members, a posture of the rope member may be determined with respect to the guide rails on which the shoe members slide, and hence the operation of the light blocking sheet may further be stabilized.

According to the embodiment disclosed here, an adjustment of the phase difference between the left and the right positions (both sides in the vehicle width direction) of the light blocking sheet is easily achieved, or an adjustment of unwinding forces on the left and the right sides of the light blocking sheet is easily achieved.

What is claimed is:

1. A sunshade apparatus comprising:
   a light blocking sheet configured to block light at an opening formed in a vehicle and open the opening to light;
   a winding member to which a first edge portion serving as an opening side edge portion of the light blocking sheet in an operating direction of the light blocking sheet is fixed and which is configured to be capable of winding and unwinding the light blocking sheet;

a pair of turning members, one of the turning members being disposed on one side of the opening in the width direction and another turning members being disposed on another side of the, opening in the width direction;

a single rope member which is adjustably engaged with a second edge portion serving as a blocking side edge portion of the light blocking sheet in the operating direction of the light blocking sheet, extends from both end portions of the second edge portion respectively toward the light-blocking side in the operating direction of the light blocking sheet, and turns at both of the turning members respectively toward the opening side in the operating direction of the light blocking sheet, and whose both side terminals are respectively fixed to both end portions of the winding member so as to be capable of being wound and unwound by the winding member; and an urging member configured to urge the winding member to rotate, wherein the rope member is fixed to the second edge portion via an operating member fixed to the second edge portion, and the apparatus further comprises an engaging portion provided on the rope member; and a restricting portion which is formed on the operating member, and to which the engaging portion is looesly fitted to restrict a displacement of the rope member along the second edge portion within a fixed range.

2. The sunshade apparatus according to claim 1, wherein the restricting portion is arranged at a center portion of the operating member in the longitudinal direction.

3. The sunshade apparatus according to claim 1, wherein the operating member includes a supporting groove extending in the longitudinal direction thereof, and the rope member is guided in the supporting groove.

4. The sunshade apparatus according to claim 2, wherein the operating member includes a supporting groove extending in the longitudinal direction thereof, and the rope member is guided in the supporting groove.

5. The sunshade apparatus according to claim 3, wherein the operating member includes guide surfaces configured to guide the rope member coming out from the supporting groove toward the turning members provided at both end portions thereof in the longitudinal direction, and hook portions configured to prevent the rope member from coming apart on the guide surfaces.

6. The sunshade apparatus according to claim 4, wherein the operating member includes guide surfaces configured to guide the rope member coming out from the supporting groove toward the turning members provided at both end portions thereof in the longitudinal direction, and hook portions configured to prevent the rope member from coming apart on the guide surfaces.

7. The sunshade apparatus according to claim 5, comprising:
a pair of guide rails extending on both sides of the opening in the width direction along the operating direction of the light blocking sheet, wherein
the operating member includes:
a handle member extending along the second edge portion and fixed to the second edge portion; and
a pair of shoe members attached at both end portions of the handle member in the longitudinal direction and configured to be slidable along the guide rail, and
the guide surfaces and the hook portions are disposed on the shoe members, 8. The sunshade apparatus according to claim 6, comprising:
a pair of guide rails extending on both sides of the opening in the width direction along the operating direction of the light blocking sheet, wherein
the operating member includes:
a handle member extending along the second edge portion and fixed to the second edge portion; and
a pair of shoe members attached at both end portions of the handle member in the longitudinal direction and configured to be slidable along the guide ran, and
the guide surfaces and the hook portions are disposed on the shoe members.

9. A sunshade apparatus comprising:
a light blocking sheet configured to block light at an opening formed in a vehicle and open the opening to light;
a winding member fixed to a first edge portion serving as an opening side edge portion of the light blocking sheet in an operating direction of the light blocking sheet and configured to r hove the light blocking sheet to the opening side by winding the light blocking sheet;
a single rope member connected to the light blocking sheet on a second edge portion serving as a blocking side edge portion of the light blocking sheet in the operating direction of the light blocking sheet and configured to move the light blocking sheet to the blocking side; and
an urging member configured to urge the winding member to rotate, wherein
the rope member is fixed to the second edge portion via an operating member fixed to the second edge portion, and the apparatus further comprises
an engaging portion provided on rope member; and
a restricting portion which is form on the operating member, and to which the engaging portion is loosely fitted to restrict a displacement of the rope member along the second edge portion within a fixed range, and wherein
the rope member is connected to both sides of the light blocking sheet in the vehicle width direction.

* * * * *